United States Patent
Ghatage et al.

(10) Patent No.: US 10,402,163 B2
(45) Date of Patent: Sep. 3, 2019

(54) INTELLIGENT DATA EXTRACTION

(71) Applicant: Accenture Global Solutions Limited, Dublin (IE)

(72) Inventors: Prakash Ghatage, Karnataka (IN); Nirav Sampat, Maharashtra (IN); Kumar Viswanathan, San Jose, CA (US); Naveen Thangaraj, Tamil Nadu (IN); Karthik Meenakshisundaram, Karnataka (IN)

(73) Assignee: Accenture Global Solutions Limited, Dublin (IE)

( * ) Notice: Subject to any disclaimer, the term of this patent is extended or adjusted under 35 U.S.C. 154(b) by 124 days.

(21) Appl. No.: 15/432,039

(22) Filed: Feb. 14, 2017

(65) Prior Publication Data

US 2018/0232204 A1     Aug. 16, 2018

(51) Int. Cl.
*G06F 16/00* (2019.01)
*G06F 7/02* (2006.01)
*G06F 16/33* (2019.01)
*G06F 16/31* (2019.01)

(52) U.S. Cl.
CPC .............. *G06F 7/02* (2013.01); *G06F 16/31* (2019.01); *G06F 16/3344* (2019.01)

(58) Field of Classification Search
CPC combination set(s) only.
See application file for complete search history.

(56) References Cited

U.S. PATENT DOCUMENTS

| | | | |
|---|---|---|---|
| 5,121,945 A | 6/1992 | Thomson et al. | |
| 6,327,656 B2 | 12/2001 | Zabetian | |
| 7,542,958 B1 * | 6/2009 | Warren | G06F 17/3089 706/48 |
| 8,406,141 B1 * | 3/2013 | Couturier | H04L 43/18 370/241 |
| 9,430,455 B2 * | 8/2016 | Schuster | G06F 17/243 |
| 9,767,192 B1 * | 9/2017 | Russak | G06F 17/3071 |

(Continued)

FOREIGN PATENT DOCUMENTS

| KR | 100707943 | 4/2007 |
|---|---|---|
| WO | WO 2007/103203 A2 | 9/2007 |

OTHER PUBLICATIONS

Examination Report No. 1 for Australian Application No. 2018200741 dated May 29, 2018, pp. 1-7.

(Continued)

*Primary Examiner* — Noosha Arjomandi
(74) *Attorney, Agent, or Firm* — Brinks Gilson & Lione

(57) ABSTRACT

Electronically received data is validated based on a digital data image that is scanned from a paper document. Known paper document source entities, paper document types and associated paper document configuration information are stored in a database. The paper documents are converted to digital data images and optically processed to identify respective source entity and document type information represented within the digital data images. Appropriate document configuration information is retrieved based on association with the detected type of document. Validation target data is extracted from the digital data images based on the configuration information and processed. The electronically received data is validated based on the extracted and processed validation target data.

20 Claims, 5 Drawing Sheets

(56) References Cited

U.S. PATENT DOCUMENTS

| | | | |
|---|---|---|---|
| 10,019,535 B1* | 7/2018 | Madhani | G06F 16/313 |
| 2004/0079800 A1* | 4/2004 | Sugino | G06K 9/00577 |
| | | | 235/436 |
| 2005/0289182 A1 | 12/2005 | Pandian et al. | |
| 2006/0242180 A1* | 10/2006 | Graf | G06F 16/86 |
| 2008/0040179 A1* | 2/2008 | Masermann | G06Q 10/08 |
| | | | 705/330 |
| 2008/0040259 A1 | 2/2008 | Snow et al. | |
| 2008/0285792 A1* | 11/2008 | Comay | G06F 17/243 |
| | | | 382/100 |
| 2009/0234818 A1 | 9/2009 | Lobo et al. | |
| 2011/0029443 A1* | 2/2011 | King | G06K 9/228 |
| | | | 705/310 |
| 2011/0033080 A1* | 2/2011 | King | G06K 9/00 |
| | | | 382/100 |
| 2011/0043652 A1* | 2/2011 | King | G06F 17/2211 |
| | | | 348/222.1 |
| 2012/0265655 A1 | 10/2012 | Stroh | |
| 2013/0198225 A1* | 8/2013 | Zalis | G06Q 10/10 |
| | | | 707/769 |
| 2014/0122341 A1* | 5/2014 | Hawkins | G06Q 20/04 |
| | | | 705/45 |
| 2015/0261748 A1* | 9/2015 | Sng | G06F 17/30011 |
| | | | 707/608 |
| 2015/0324640 A1* | 11/2015 | Macciola | G06Q 10/10 |
| | | | 382/112 |
| 2016/0004706 A1* | 1/2016 | Faghihi Rezaei | G06F 17/3064 |
| | | | 707/706 |
| 2017/0046425 A1* | 2/2017 | Tonkin | G06F 17/30684 |
| 2017/0124413 A1* | 5/2017 | Deng | G06K 9/344 |
| 2017/0249507 A1* | 8/2017 | King | G06K 9/00483 |
| 2018/0096203 A1* | 4/2018 | King | G06F 17/214 |
| 2018/0176409 A1* | 6/2018 | Smith | H04N 1/32133 |

OTHER PUBLICATIONS

Pamphlet, Accenture Credit Services, "Mortgage Lending Within the Everyday Bank," (2015) downloaded from https://www.accenture.com/my-en/insight-mortgage-lending-everyday-bank-transactions-relationships.

Examination Report No. 2 for Australia Application No. 2018200741, dated Dec. 19, 2018, pp. 1-7.

* cited by examiner

INTELLIGENT DATA EXTRACTION

BACKGROUND

1. Technical Field

The disclosure relates to the field of automated intelligent data extraction, and more particularly, it relates to techniques for validating electronically processed data based on intelligently extracted data from varying types of paper documents.

2. Related Art

In some systems, high volumes of electronic data undergoing data processing may require concurrent electronic data validation against data provided in paper documents. Furthermore, the process of validating electronic data against target data extracted from paper documents may require high rates of accuracy and may require that the validation results are generated within strict real-time limits imposed by the concurrent electronic data processing and validation processing.

Additional technical hurdles may be confronted while fulfilling the time and accuracy constraints when the target data for each validation request must be extracted from multiple different types of paper documents and/or multiple types of data representations. For example, the data may vary with respect to: labeling of data, ways of representing data, configurations or layout of data and varying types of numerical formatting used.

DETAILED DESCRIPTION

Figure 1:
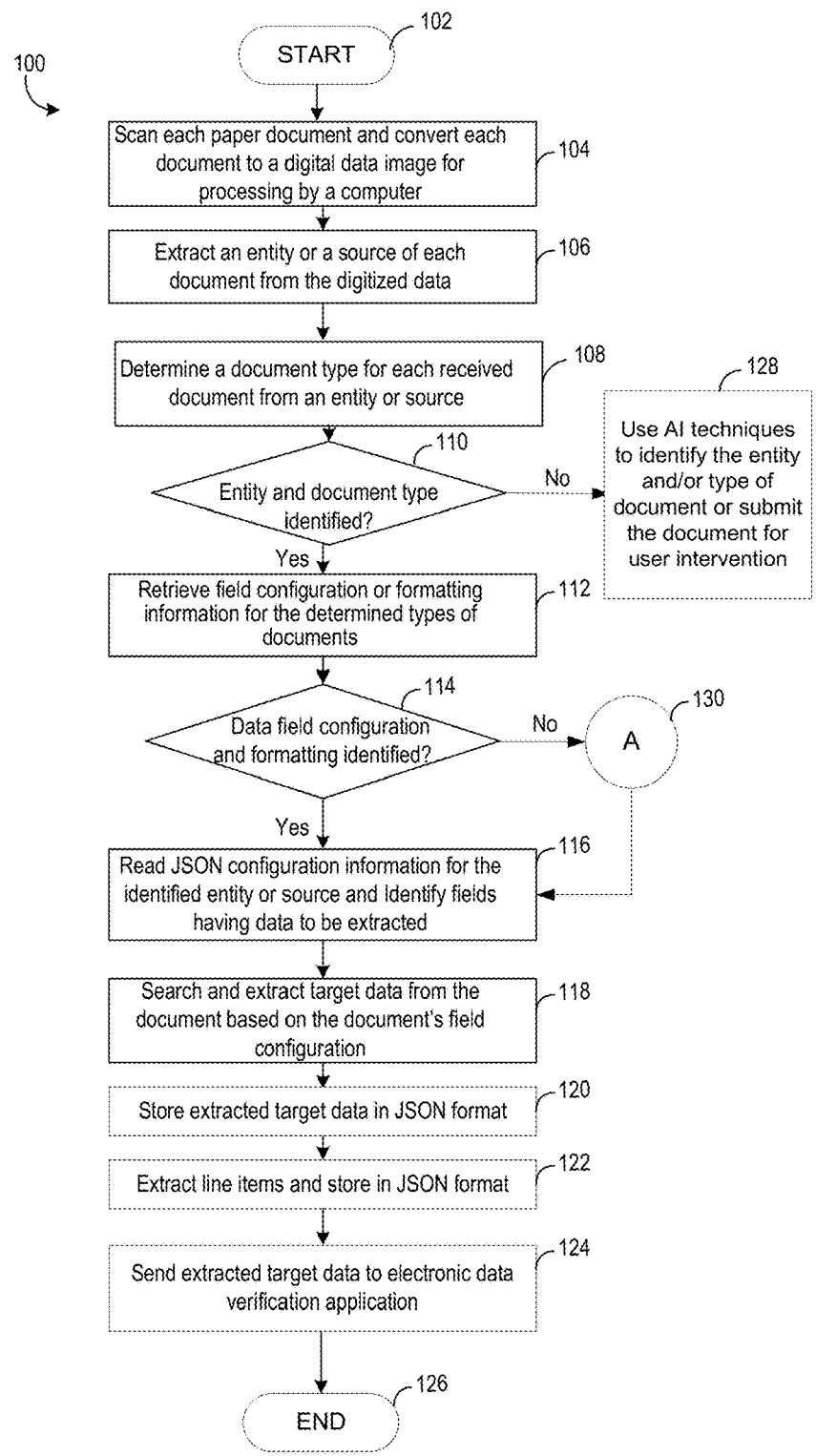
FIG. 1 is a flow chart comprising exemplary steps for electronic data validation utilizing intelligent data extraction from a digital data image.

A method and system are provided for validating electronically received data based on reference data that is converted from printed paper documents. The system may electronically receive user input, for example, via an online fillable form that may be provided to a user or a service provider staff member for inputting and processing of user data. For example, the electronic form may be an application for a service or a position and the input may be used to process the user's application data. Concurrently, the user may submit proof of their electronically input data using paper copies of various documents. The paper documents may be scanned and the resulting digital data image may be optically processed, for example, by optical character recognition (OCR). Output from OCR scanned paper documents may be analyzed in order to identify and extract target reference data to be used for verification of the user's electronically entered application data.

The paper documents may include a printed name, identity number or symbol that represents an entity or organization that authored the paper document. The paper document may have a known or expected configuration of data that may indicate to the system where to find and how to interpret target data within the document to be used in the verification process. For example, the configuration may include a known pattern of data, a layout or location of target data within the document, formatting and/or tables of data. However, an entity may produce multiple versions or types of documents with different configurations that sometimes provide the same or similar target information. The validation system may store expected or known entity identification information, types of documents and corresponding document configurations, as well as expected characteristics of these types of information. These expected characteristics may be utilized for intelligently recognizing new entities, types of documents and configurations and creating entity, document type and configuration records in the system for future use.

When a paper document is received and scanned, the system may analyze OCR output and identify an entity and type of document using the stored information. Based on the entity and type of document, the system may retrieve an expected configuration or layout of data and formatting of data used in the document. The data configuration may be utilized to locate target reference data within the document for use in the verification and validation process. When an OCR scanned document cannot be matched to a known entity, document type or data configuration, the tool automatically creates a new configuration template and automatically extracts the target data based on the newly created configuration. The extracted target date may be utilized to validate electronically received data. The extracted target data may be processed, for example, utilizing calculations that may be performed on the extracted target data and the results may be utilized as reference data in a comparison to the electronically received data, for verification and/or validation of the electronically received data.

In some embodiments the concurrent electronic application data processing and paper document verification processing may need to be performed within specified real-time constraints. In one example, a service provider staff member may process an application and verify the application information while a customer waits. The time allowed for the application and concurrent verification processing may be limited to ten or twelve minutes. Moreover, the service provider system may be subject to steep fluctuations in the volume of traffic and may dynamically adapt to the changing loads on processors, memory and servers to meet the real-time and accuracy requirements of the concurrent application and verification processes while maintaining an efficient use of resources.

FIG. 1 is a flow chart comprising exemplary steps for electronic data validation utilizing intelligent data extraction from a digital data image. In some embodiments, electronic data may be entered into a system via a user interface for processing by a software application, and a request may be entered to verify the electronic data based on information submitted within a paper document.

The exemplary steps begin in step 102. In exemplary step 104, paper documents may be scanned and converted to digital image data for processing by a computer.

In exemplary step 106, the digital image data is processed, for example, optical character recognition (OCR) may be performed and a confidence level may be provided for the results. An entity or source of the document may be extracted from the digital image data based on searches for known or stored entity information.

In exemplary step 108, a document type may be determined for each document received from the entity or source based on data extracted from the digital data image.

In exemplary step 110, in instances when an entity and document type are successfully extracted from the digital data images, the exemplary steps proceed to step 112.

In exemplary step 112, for the determined entity and/or document type of each digital data image, corresponding configuration information may be retrieved from memory. The configuration information may be stored in java script object notation (JSON). The configuration information may indicate where to find target data within a particular document type for extraction of the target data, and may include known patterns of data, a layout or location of target data within the document or within tables in the document and types of numerical formatting used.

In exemplary step 114, in instances when configuration information has been successfully retrieved for the digital data images, the steps may proceed to exemplary step 116.

In exemplary step 116, the configuration information for each digital data image document may be read.

In exemplary step 118, the configuration information may be utilized to locate and extract target data from the digital data image documents. For example, the a digital data image may be searched and target data extracted based on the configuration information and based on one or more artificial intelligent techniques such as Named Entity Extraction, behavior tree searching, fuzzy matching, Aho-Corasick algorithm and pattern recognition techniques.

In exemplary step 120, extracted target data may be processed and/or stored in memory in JSON format.

In exemplary step 122, custom algorithms may be utilized for extracting line items from the digital data images. For example, a value or amount column may be used as an extraction base column. Once details about the value or amount are extracted, a respective row may be extracted and the system may determine how the extracted data should be treated (for example, a positive or negative value may be indicated by a "+" or "−" symbol or "Cr" or "Dr" symbol). If the value is a positive value, the date may be extracted from the row based on a determined variant. The remaining data from the row may be put placed into a description field. If the description data is part of excluded list, that particular row may be excluded and not considered.

In exemplary step 124, the extracted target data may be transmitted to an electronic data verification application and may be compared to the electronic data received via the user interface to verify that the electronic data received via the user interface is valid. For example, when the difference between the extracted target data and the electronic data received via the user interface is within a specified variance, the electronic data may be validated and processed by the software application.

The exemplary steps may end at step 126.

However, in exemplary step 110, in instances when the entity and document type are not successfully extracted from the digital data images, the exemplary steps proceed to step 128.

In exemplary step 128, artificial intelligence (AI) techniques such as Named Entity Extraction, behavior tree searching, fuzzy matching, Aho-Corasick algorithm and pattern recognition and/or algorithmic subroutines may be utilized with stored information about entities and document types in general to identify the entity and/or type of document. Otherwise, the document may be displayed for user intervention via an interactive graphical user interface.

Furthermore, in exemplary step 114, in instances when the configuration information has not been successfully retrieved for the digital data images, the steps may proceed to exemplary step 130 A. Exemplary step 130 A is described with respect to FIG. 2.

In one embodiment, an on-line credit application assessment and data validation tool using OCR scanning may be provided. An electronic credit application may be submitted to the on-line tool for each customer. Customers may also provide physical copies of their bank statements and/or pay slips, for example, during the credit application process in order to validate credit eligibility data that is also provided in the electronic loan application. The OCR based data verification solution may be applied to extract salary type bank deposits (target data) from customers' bank statements, for example, extracting salary information over a number of months. The extracted salary deposits may be used as proof of on-going available funds and verification of the information provided by the user in the on-line credit application. Salary data may be identified on the bank statements and/or pay slips. In some embodiments, certain types of data in the physical documents may be excluded from the credit eligibility determination process, for example, unemployment funds received, loans and reserves that may be listed in a bank statement may be excluded from the extraction process. However, the disclosure is not limited with respect to what kinds of information or data may be extracted from the physical documents or used in an application process, or which types of physical documents may be processed for data extraction.

In one example, the credit eligibility validation tool may handle paper copy bank statements received from multiple different banks. The statements from each bank may be generated in multiple different formats or with multiple different data configurations. For example, types of statements generated by an ATM machine may be configured differently than types of statements generated by a personal computer and printer from a webpage. The paper copy statements may be digitized and input directly into the credit assessment tool for OCR processing. The OCR validation analysis process may run in parallel or concurrently with the on-line credit application processing, and may verify data entered into the on-line credit application within a specified time limit, for example, within 12 minutes while a customer waits for an extension of credit.

Bank names (entities) and bank statement types may be extracted from the bank statement digital images by the OCR based tool utilizing natural language processing techniques, for example. Similarly, employer names or pay slip types may be extracted from pay slips for example. The tool may extract target data from the various bank statement images using artificial intelligent search algorithms and known configurations or templates for each type of bank statement. The configuration information may be stored in memory as JSON objects.

The OCR based tool may extract data from the various bank statement or pay slip images based on the known data configurations or templates that may enable identifying fields or locations in the bank statements or pay slips that are populated with target data to be extracted. The configuration information may also be utilized to identify values of data to be extracted based on specified data fields and data positions, for example.

In instances when a new or unrecognized type of document such as a bank statement or pay slip is received by the OCR tool or when a configuration cannot be found for a document image, instead of generating an error and triggering manual action to define a new configuration for the document, the tool may automatically create a new configuration template and/or new type for the document by analyzing the document image based on image comparisons and/or stored knowledge about other documents such as bank statement or pay slip characteristics, configurations, formatting, and information known about types and patterns of data found within bank statements or pay slips in general. The tool may then automatically extract target data from the new type of bank statement or pay slip based on the newly created configuration.

Document configuration information may indicate data formats and/or the structure of information represented in a document, or a document type. For example, the configuration information may indicate a format and a location of a phone number, a fax number, an address and/or a logo in the document. In some instances, configuration information for a document may be determined by comparing the document with a known document to recognize data such as a phone number or to identify a document type, such as "mini statement." The configuration information may include, for example, keywords or target data, location of keywords or target data, length of key words or target data, column headers and/or column order.

Once target data is extracted, the credit assessment and data validation tool may compare the electronic credit application data with the bank statement data to verify or correct data in the credit application. For example, when the difference between the target data extracted from the bank statement image and the electronic data received via the online credit application is within a specified variance, the electronic data in the credit application may be validated or corrected and processed by the to determine credit eligibility for a customer based on the validated credit application data. Otherwise, when the credit application data is not validated a service provider administrator may verify the data so that the credit application may be processed.

Furthermore, newly created and/or existing bank statement configurations may be displayed and interactively updated by a user in a user interface for improved identification and extraction of data in the future. Also, new configurations and data formats may be defined by a user using the interactive user interface.

Although the present example describes processing a credit application, the disclosure is not limited in this regard and any suitable electronic data entered on-line may be verified by data received in digitized images from paper documents using the above described methods and systems. For example, grades in an on-line college application may be verified with multiple copies of paper records, such as report cards and school transcripts.

Figure 2:
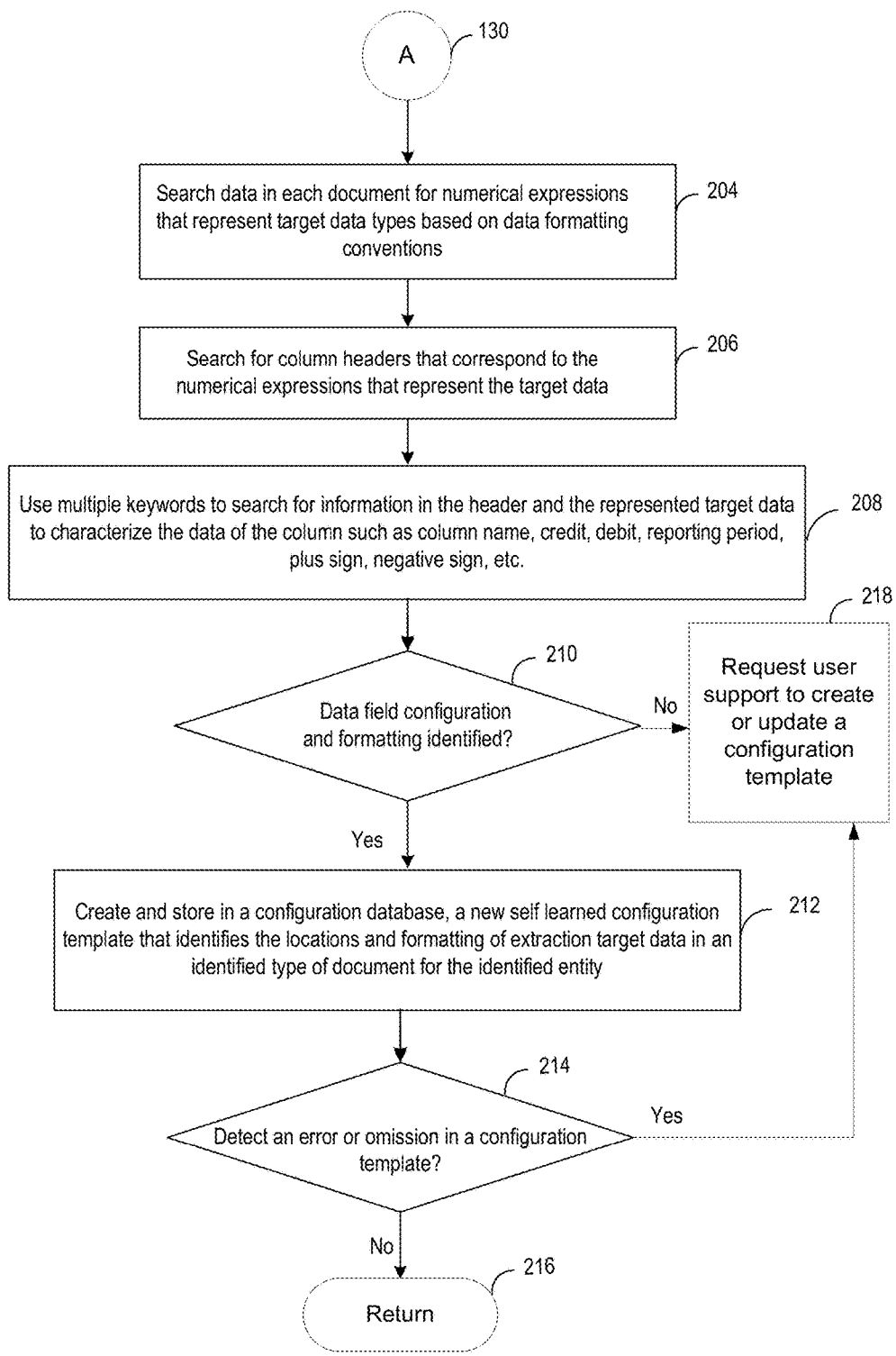
FIG. 2 is a flow chart comprising exemplary steps for electronic data validation utilizing intelligent data extraction from a digital data image and creating a new self-learned document configuration template.

FIG. 2 is a flow chart comprising exemplary steps for electronic data validation utilizing intelligent data extraction from a digital data image and creating a new self-learned document configuration template.

The exemplary steps of FIG. 1 may continue at step 130 in instances when the configuration information has not been successfully retrieved for a digital data image. The steps may proceed to exemplary step 204.

In exemplary step 204 the system may search through a digital data image for numerical expressions that represent specified target data types based on generally known data formatting conventions. For example, the target data may be amounts of money from a salary listed in a bank statement and the searching algorithms may look for various formatting conventions for currency used in Europe or the U.S.

In exemplary step 206, the system may search for types of column headers that correspond to the numerical expressions that represent the target data, for example, based on stored general knowledge about bank statement column headers.

In exemplary step 208, the system may use multiple keywords to search for information in the headers and the represented target data to characterize or interpret the data represented in the column, such as column name, credit, debit, reporting period, plus sign, negative sign, etc.

In exemplary step 210, in instances when the new document configuration and formatting information are identified, the exemplary steps may proceed to step 212.

In exemplary step 212, a new self-learned configuration template may be created based on the newly identified document configuration and formatting information, and the new configuration template may be stored in a configuration database for use in the electronic verification and validation tool. The new configuration template may identify locations and formatting of extraction target data within an identified type of digital image document for an identified entity. For example, the location and formatting of amounts of money from a salary may be provided for a letter size bank statement from a specified bank.

In exemplary step 214, in instances when an error or omission in a configuration template is not detected, the exemplary steps may proceed to step 216 and in some embodiments may return to step 116 of FIG. 1 for further processing. Otherwise, the exemplary steps may end at step 216.

However, in exemplary step 210, in instances when the new document configuration and formatting information are not identified, the exemplary steps may proceed to step 218.

In exemplary step 218, the system may request user support to create or update a configuration template through a user interface. For example, a service provider agent may create a new configuration template via a user interface or web browser.

Furthermore, in exemplary step 214, in instances when an error or omission in a configuration template is detected, the exemplary steps may proceed to step 218.

In one embodiment, OCR processing, entity recognition and/or configuration template creation may be performed based on a complex custom model that may be trained over time based on extracted target or other data. The custom model may be based on a plurality of models including, for example, models that identify entities or bank names, models that identify customer names and/or models that identify street addresses. The models may be trained based on extracted target or other data from bank statement images. In some systems, the plurality of models may be merged to create one custom model. Similarly, models including various formats for representing amounts of money or various formats for representing dates may be trained utilizing extracted data. The models may be used to validate or correct bank names, dates, employer names, customer names, account numbers or other keywords used in the extraction and credit application processing, for example. In one embodiment the models may be utilized to verify that the customer name on the bank statement is the same as the customer name in the credit application.

Figure 3:
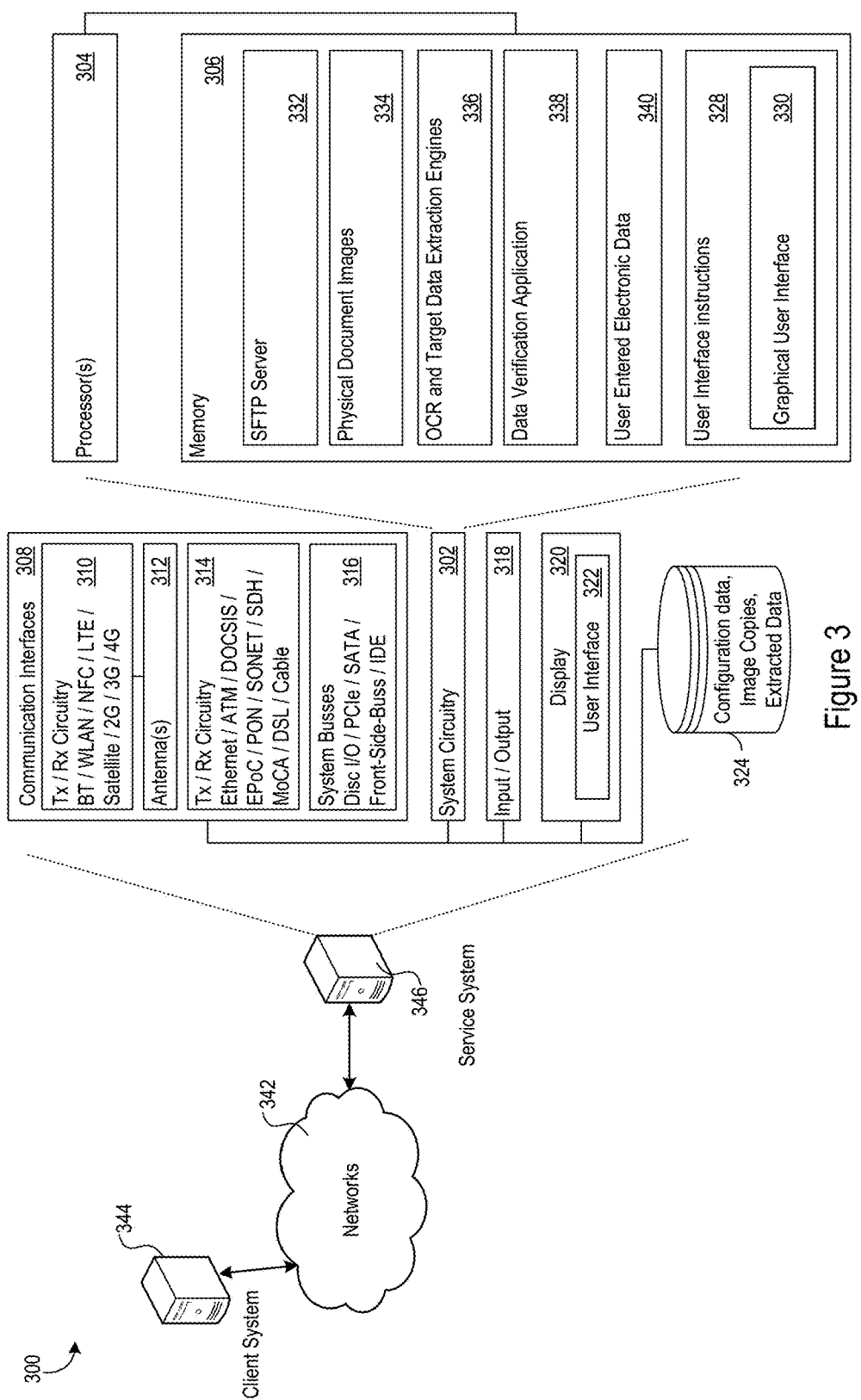
FIG. 3 is an illustration of a system for verification of user entered electronic data based on data extracted from paper documents.

FIG. 3 is an illustration of a system for verification of user entered electronic data based on data extracted from paper documents. Referring to FIG. 3 there is shown a system 300.

The system 300 may include any suitable circuitry, logic, code and or interfaces that are operable to implement a data processing and data verification tool as described with respect to FIGS. 1-2 and FIG. 4-5.

The system 300 includes a client system 344, computer networks 342 and a service system 346. The service system 346 includes communication interfaces 308, system circuitry 302, input output circuitry 318, a display unit 320 and one or more storage devices 324.

The service system 346 may be communicatively coupled to the client device 344 via the one or more networks 342.

The system circuitry 302 may include the processor 304 and the memory 306. The system circuitry 302 may support implementation of the various intelligent data extraction and electronic data verification functions described with respect to FIGS. 1-2 and 4-5. The system circuitry may be communicatively coupled to the one or more storage devices 324.

In one embodiment, of the system circuitry 302 may include one or more processors 304, the memory 306 and other circuitry. The one or more processors 304 may be connected to the memory 306 that may comprise memory systems including a plurality of memory devices collocated with the one or more processors 304 or distributed across multiple systems. The memory 306 may store intelligent data extraction control instructions, operational parameters for the control instructions, datasets, and other information described with respect to FIGS. 1-2 and 4-5. For example, the control instructions may be executed by the one or more processors 304 to implement the intelligent data extraction functions according to configuration data sets stored in a configuration database, for example in the one or more storage devices 324.

Furthermore, in some embodiments, various software and/or hardware modules may be may be implemented by the system circuitry 302 to execute the functions described with respect to FIGS. 1-2 and 4-5. For example, an SFTP server 332, a physical document image generation unit 334, an optical character recognition and target data extraction unit 336, a data verification application 338, a user interface instruction unit 328 and a graphical user interface unit 330 may be stored in the memory 306 and may be utilized to implement the intelligent data extraction and electronic data verification functions in whole or in part by one or more instances of the system circuitry 302.

In one embodiment, the data verification application 338 may automatically compare salary data entered on-line to salary data from the physical document image store 334 to verify that the on-line entered data is valid. The salary data in the physical document image store 334 may comprise salary data digitized from paper bank statements and extracted by the OCR and target data extraction engines 336. The data verification application 338 may verify that the on-line entered salary data is valid by comparing it to the bank statement derived salary data and may correct the data within the credit application if needed. In some systems, the data verification application 338 may also calculate credit eligibility and/or credit limits for a customer based on the validated credit application data.

The OCR and target data extraction engines 336 and/or the data verification application 338 may be referred to as an OCR engine.

The service system 346 may also include communication interfaces 308, which may support suitable wireline interfaces 314 or wireless communication via wireless communication circuitry 310 and/or antennas 312. Some examples of wireless communication protocols utilized by the intelligent data extraction and electronic data verification system may include Bluetooth, Wi-Fi, WLAN, near field communication protocols, cellular protocols (2G, 3G, 4G, LTE/A), and/or other wireless protocols. Also, communication interface 308 may include wired communication circuitry 314. Example wired communication protocols may include Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax alliance (MoCA) protocols, digital subscriber line (DSL) protocols, cable communication protocols, and/or other networks and network protocols. The communication interfaces 308 may be connected or configured to be connected to the networks 342, including any suitable wireless or wireline network, the Internet or an intranet, to enable the service system 346 and the system circuitry 302 to communicate with other systems and devices, for example, the client system 344. Additionally, the communication interface 308 may include system buses 316 to effect intercommunication between various elements, components, and circuitry portions of the service system 346. Example system bus implementations include PCIe, SATA, and IDE based buses. However, the intelligent data extraction and electronic data verification system is not limited to any specific types of communication technology.

The communication interfaces 308 may support communication with one or more external client devices 344. Communication with the external one or more client devices 344 may be effected through the graphical user interface 330 and user interface instructions 328, for example.

In one embodiment, a dynamically reconfigurable GUI may be provided to the external one or more client devices 344 via the one or more networks 342 to enable interaction between the one or more client devices 344 and the service system 346. In one example, the service system 346 may comprise a web server capable of providing web services or web pages to the one or more client devices 344.

In some embodiments, the service system 346 may itself include various I/O interfaces 318 and/or a display 320, for example, to enable local interaction with the various circuitry elements discussed above instead of or in addition to interaction over the networks 342 with a remote client device 344. In some examples, the display device 320 can provide a user interface 322 to a local user, which can be the same as or a variation of a user interface that can be provided to a remote client device 344 (discussed below).

Additionally, the I/O interfaces 318 and display 320 may enable local service provider administrators to interact with the service system 346. A local GUI may be provided via the local display 320 to present a user interactive interface for the intelligent data extraction and electronic data verification to a service administrator. The local GUI may support access, such as, via a web-based GUI, to enable monitoring, configuring and updating intelligent data extraction and electronic data verification processes on the service system 346 or interaction with the client system 344 for example. In one example, newly created and/or existing bank statement configurations may be displayed and interactively updated by a service provider agent in a local display 320 GUI for custom identification and/or extraction of data. Also, new configurations and data formats may be defined by a user using the display 320 GUI.

Figure 4:
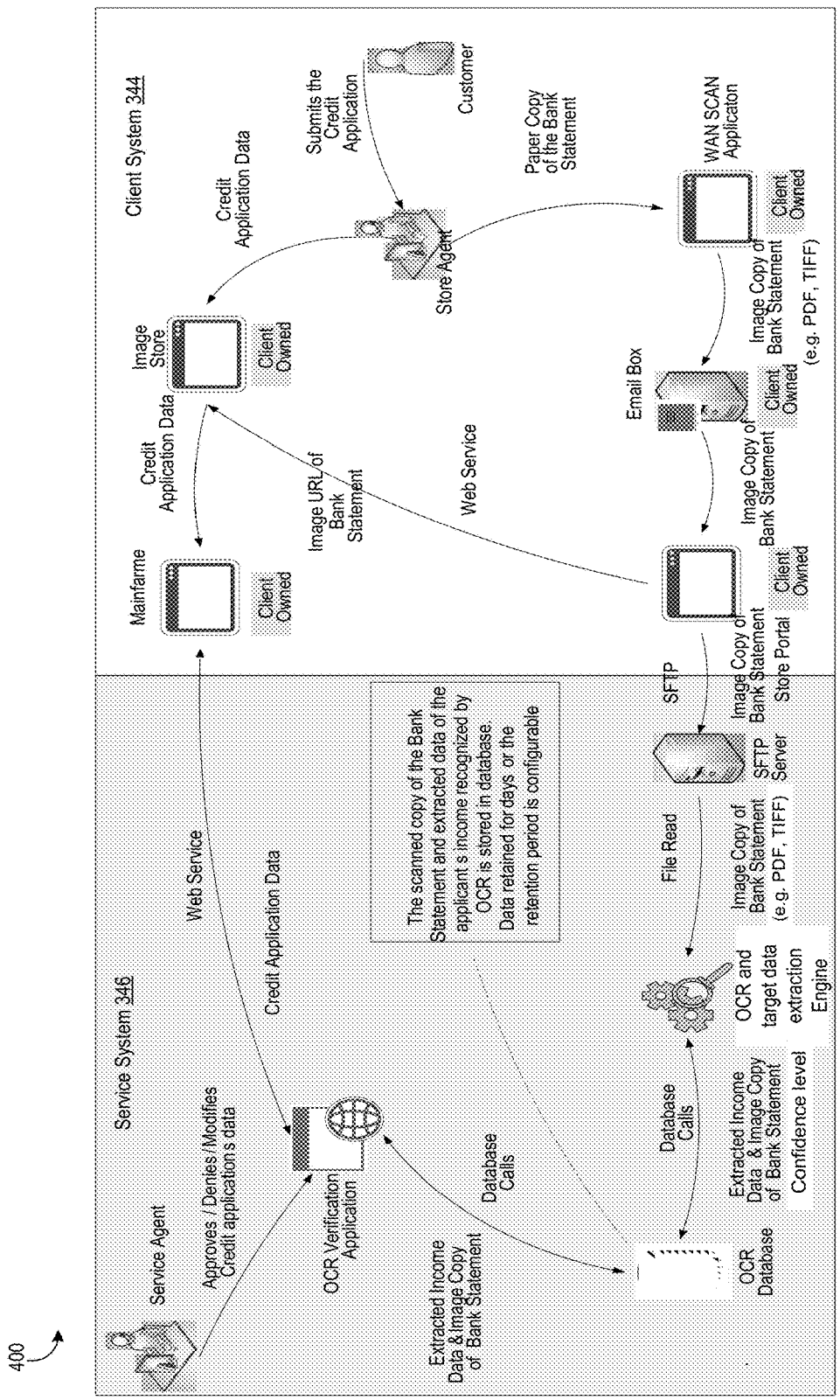
FIG. 4 is an exemplary data flow diagram for validating electronic data received via fillable forms and validating the electronic data based on intelligent data extraction from paper documents.

The service system 346 may be communicatively coupled to the one or more storage device 324 that may comprise a hard drive, solid-state drive, or other memory system, to enable storage of system software, user interfaces, or system instructions. The one or more storage devices 324 may comprise a plurality of databases, for example, a configuration template database, FIG. 4 is an exemplary data flow diagram for validating electronic data received via fillable forms and validating the electronic data based on intelligent data extraction from paper documents. Referring to FIG. 4 there is shown an exemplary intelligent data extraction and electronic data verification system 400. The system 400 includes one embodiment of the service system 346 and the client system 344 that are described with respect to FIG. 3.

In this embodiment, credit providers may be required to validate customer income prior to granting or increasing credit by processing multiple types of paper bank statements and/or pay slips. The layout and formatting in these statements may vary based on the source of the statement. Previously, customers merely stated their income on a credit application for credit eligibility evaluation. However, in certain jurisdictions, new government regulations require that credit providers validate customer income, which may be provided in the form of paper documents. Due to the new requirements, credit provider's systems must accurately assess data from the various paper documents, verify that the salary data in an on-line credit application is correct based on the salary data represented in the paper documents, determine whether the applicant is eligible to receive credit and how much credit the applicant may receive, and deliver the credit to the customer, all while the customer waits at a store or point of sale for the results. Moreover, the system must efficiently accommodate widely varying volumes of on-line credit applications by auto-scaling its processing and memory resources. For example, the volume of applications may vary from 187 credit applications per minute during exemplary peak volume to processing only 5 or 6 credit applications per hour at other times. However, while auto-scaling resources, the system may maintain performance objectives with respect to accuracy and meeting real-time constraints for both concurrent on-line credit application assessment and salary verification based on data provided in paper documents.

The on-line credit application including the applicant's salary information may be populated by a store agent or a customer applicant using the client system 344. The customer may submit the paper documents, for example, bank statements that provide proof of the on-line credit application salary information. The store agent or customer may scan the paper bank statements and the bank statements may be converted to digital image data, for example, as a PDF or TIFF images. The client system 344 may transmit the electronic data of the on-line credit application and the digital image data from the paper bank statements to the service system 346. The service system 346 may perform OCR to encode the digital image data and extract the salary information from the digital image data, as described with respect to FIGS. 1-4, and may verify that the electronic salary data of the on-line credit application is valid based on the salary information extracted from the digital image data. In some embodiments, the OCR encoding process may utilize Base64 encoding and decoding processes. Furthermore, in some embodiments, the OCR requests may be token based, where a token may be used for each incoming request and the token may be validate for a specified amount of time. When a token expires, the requestor may need to generate a new token for continued processing. However, the disclosure is not limited to token based requests, or to any specific type of OCR encoding and decoding processes.

In some embodiments, a service provider agent utilizing a user interface in the service system 346 may monitor and/or intervene in the credit application processing or the salary verification processing steps to approve or deny a credit application, modify data in the application or create or update configuration templates described with respect to FIGS. 1 and 2. The results of the credit application processing may be returned to the client system 344, for example, in a web browser, and the store agent may process the results to provide or deny credit to the waiting customer.

Figure 5:
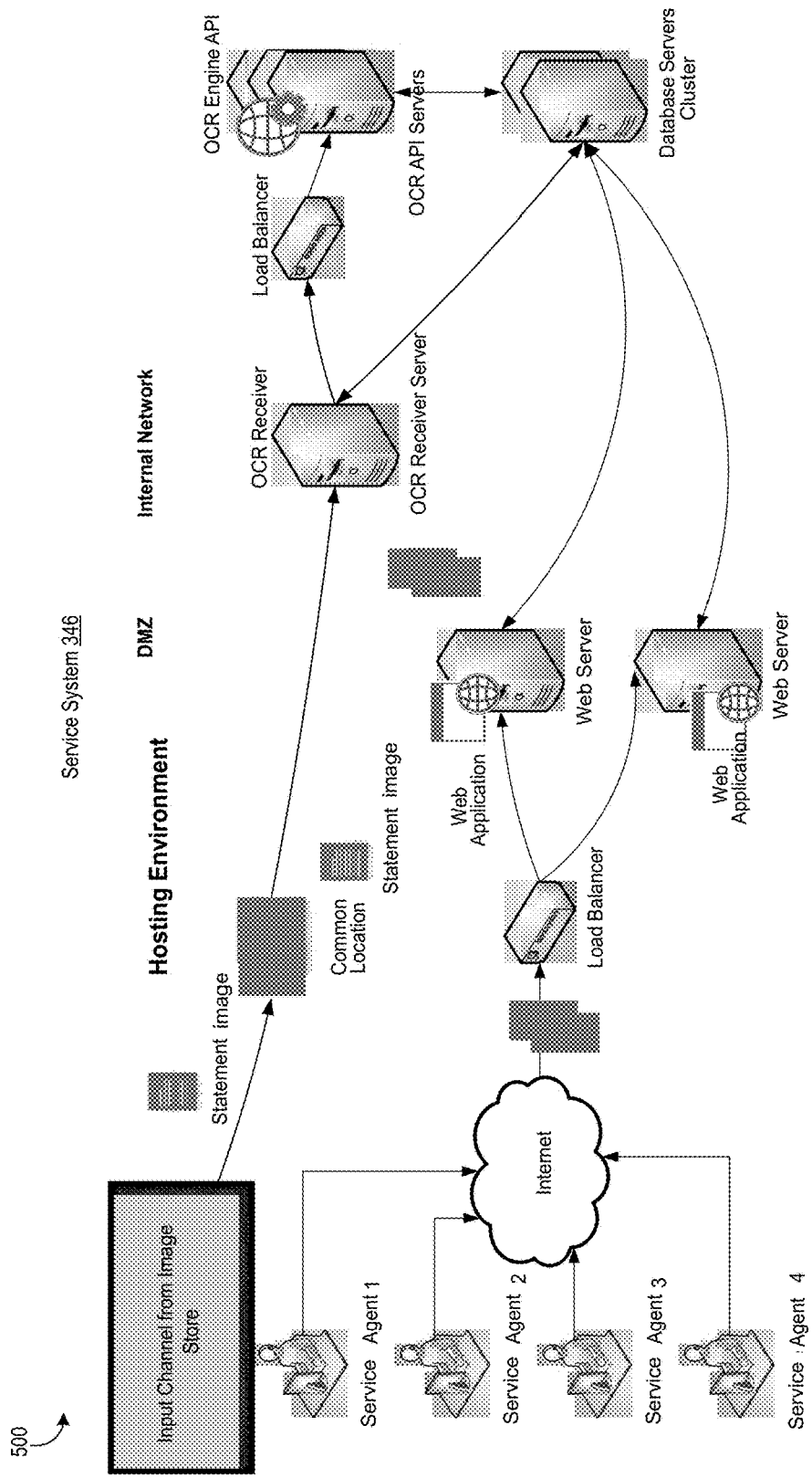
FIG. 5 is an exemplary data flow diagram that illustrates system adaption to variations in load on a system for validating electronic data based on data extracted from paper documents.

FIG. 5 is an exemplary data flow diagram that illustrates system adaption to variations in load on a system for validating electronic data based on data extracted from paper documents. Referring to FIG. 5 there is shown a system 500 comprising an embodiment of the service system 346. Continuing with the example of utilizing the service system 346 for on-line credit application validation and processing described with respect to FIGS. 1-4, the system 500 may be operable to auto-scale its resources independently to meet both of varying volumes of credit application traffic and varying volumes of concurrent bank statement image data extraction. For example, servers, hardware processors, memory and virtual machines (VMs) may be added, removed, placed in a wait state or modified based on the demands of varying levels of offered traffic and satisfying real-time processing constraints. In some systems, the resource auto-scaling operations may occur independently with respect to resources allocated for the on-line credit application processing versus resources allocated to concurrent OCR based data extraction in order to maintain the real-time processing constraints for the concurrent processing systems. The independent auto-scaling operations may enable the system to efficiently adapt to varying loads of application traffic relative to varying loads of paper document processing. For example, some credit applications may have fewer or more corresponding paper documents to process or for some credit applications, the paper documents may require fewer or more processing steps based on the availability of known configuration templates. The independent auto-scaling of resources may depend on one or more configurable real-time thresholds that may trigger auto-scaling of respective resources in order to keep up with credit application and OCR verification processing time constraints.

In one embodiment of the system 500, bank statement image data may be retrieved from an image storage device, such as the storage device 334, for OCR processing and extraction of salary data, as described with respect to FIGS. 1-4. An OCR system receiver server may receive and/or store the bank statement image data and forward this data via a load balancer to one or more OCR engine application interfaces (API) executed by one or more OCR API servers. The load balancer may control auto-scaling of the OCR API server resources. Concurrently, credit application data may be entered on-line by one or more service agents and forwarded via the Internet and a second load balancer to one or more web application servers. The second load balancer may control auto-scaling of web application server resources. The credit application data may be forwarded to a database server cluster and may be retrieved by the OCR API servers to verify salary data in the credit card application based on the salary data from the corresponding bank statement images.

Various intelligent data extraction and electronic data verification functions have been specifically described. However, many other implementations are also possible.

We claim:

1. A method for validating electronic data, the method comprising:
    storing in a database, data representative of:
        a plurality of entities;
        one or more document types, wherein each of the one or more document types is associated one or more of the plurality of entities; and
        one or more configurations, wherein each of the one or more configurations comprises configuration information associated with one or more of the document types;
    receiving an electronic data validation request, the request comprising electronic data input by a user comprising customer specific data to be validated by comparison with data extracted from paper documents provided by the customer;
    receiving digital data images representing electronically scanned paper documents, associated with the electronic data validation request, said paper documents being provided by the customer;
    optically processing each respective digital data image to convert the image into machine readable text, identifying from the machine readable text an entity corresponding to one of the stored plurality of entities that is represented within the respective digital data image, and determining a document type corresponding to one of the one or more document types from the respective digital data image;
    retrieving configuration information corresponding to each respective digital data image having an identified entity and determined document type based on the identified entity and the determined document type of the respective digital data image;
    extracting target data from each respective digital data image for which configuration information is retrieved, wherein the extracting is based on the configuration information corresponding to each respective digital data image;
    validating the electronic data input by the user by comparing it with the target data extracted from each respective digital data image of the one or more scanned paper documents associated with the electronic data validation request and determining whether the electronic data and target data match; and
    transmitting a response to the electronic data validation request indicating the result of the electronic data validation.

2. The method for validating electronic data of claim 1, wherein the entity represented within the digital data image indicates a source of a corresponding paper document.

3. The method for validating electronic data of claim 1, wherein the configuration information corresponding to an entity and document type indicate types of data, data or data field locations and data formatting information for a digital data image corresponding to the entity and document type.

4. The method for validating electronic data of claim 1, wherein the configuration information is stored in the database as Javascript object notation (JSON) and indicates from which fields of a corresponding respective digital data image to extract the validation target data.

5. The method for validating electronic data of claim 1, further comprising storing the extracted target data in JSON format.

6. The method for validating electronic data of claim 1, wherein the entity of the plurality of entities is identified utilizing natural language processing and data extraction techniques.

7. The method for validating electronic data of claim 1, wherein the document type of the one or more document types is detected from the respective digital data image utilizing fuzzy matching techniques or approximate string matching techniques.

8. The method for validating electronic data of claim 1, wherein the target data is searched and extracted from each respective digital data image for which configuration information is retrieved based on one or more of artificial intelligent techniques, behavior tree searching, fuzzy matching, AhoCorasick algorithm and pattern recognition techniques.

9. The method for validating electronic data of claim 1, further comprising: creating a new self-learned configuration in instances when the configuration information is not available; searching within a digital image data document corresponding to the detected document type for numerical expressions that represent various known types of target data based on known target data formatting conventions; searching for column headers that correspond to the numerical expressions; searching the column headers and the numerical expressions for keywords and symbols that characterize the data of each column; storing in the database, the new self-learned configuration, locations and formatting of found types of target data, the column headers, and the data characteristics; and associating the new self-learned configuration with a detected document type.

10. A system for validating electronic data, the system comprising:
    a computer processor;
    a memory that stores instructions, wherein the instructions when executed by the computer processor cause the computer processor to:
        store in a database:
            data representative of: a plurality of entities;
            one or more document types, wherein each of the one or more document types is associated one or more of the plurality of entities; and
            one or more configurations, wherein each of the one or more configurations comprises configuration information associated with one or more of the document types;
        receive an electronic data validation request, the request comprising electronic data input by a user comprising customer specific data to be validated by comparison with data extracted from paper documents provided by the customer;
        receive digital data images representing electronically scanned paper documents associated with the electronic data validation request, said paper documents being provided by the customer;
        optically process each respective digital data image to convert the image into machine readable text, identify from the machine readable text an entity corresponding to one of the stored plurality of entities that is represented within the respective digital data image, and determine a document type corresponding to one of the one or more document types from the respective digital data image;
        retrieve configuration information corresponding to each respective digital data image having an identified entity and determined document type based on the identified entity and the determined document type of the respective digital data image;

extract target data from each respective digital data image for which configuration information is retrieved, wherein the extraction is based on the configuration information corresponding to each respective digital data image; and validate the electronic data input by the user by comparing it with the target data extracted from each respective digital data image of the one or more scanned paper documents associated with the electronic data validation request and determining whether the electronic data and target data match; and transmit a response to the electronic data validation request indicating the result of the electronic data validation.

11. The system for validating electronic data of claim 10, wherein the entity represented within the digital data image indicates a source of a corresponding paper document.

12. The system for validating electronic data of claim 10, wherein the configuration information corresponding to an entity and document type indicate types of data, data or data field locations and data formatting information for a digital data image corresponding to the entity and document type.

13. The system for validating electronic data of claim 10, wherein the configuration information is stored in the database as Javascript object notation (JSON) and indicates from which fields of a corresponding respective digital data image to extract the validation target data.

14. The system for validating electronic data of claim 10, wherein the instructions when executed by the computer processor further cause the computer processor to store the extracted target data in JSON format.

15. The system for validating electronic data of claim 10, wherein the entity of the plurality of entities is identified utilizing natural language processing and data extraction techniques.

16. The system for validating electronic data of claim 10, wherein the document type of the one or more document types is detected from the respective digital data image utilizing fuzzy matching techniques or approximate string matching techniques.

17. The system for validating electronic data of claim 10, wherein the target data is searched and extracted from each respective digital data image for which configuration information is retrieved based on one or more of artificial intelligent techniques, behavior tree searching, fuzzy matching, AhoCorasick algorithm and pattern recognition techniques.

18. The system for validating electronic data of claim 10, wherein the instructions when executed by the computer processor further cause the computer processor to:

create a new self-learned configuration in instances when the configuration information is not available;

search within a digital image data document corresponding to the detected document type for numerical expressions that represent various known types of target data based on known target data formatting conventions;

search for column headers that correspond to the numerical expressions;

search the column headers and the numerical expressions for keywords and symbols that characterize the data of each column;

store in the database, the new self-learned configuration, locations and formatting of found types of target data, the column headers, and the data characteristics; and associate the new self-learned configuration with a detected document type.

19. A method for validating electronic data, the method comprising:

polling a computer memory queue by robotic process automation for electronic data received via a web-based electronic user filled form for a credit application, wherein the electronic data includes income information;

downloading concurrently a digital data image from an online optical storage when the electronic data is received, wherein the digital data image is based on documents provided by the user and corresponds to the received electronic data;

transmitting the electronic data and the digital data image to a remote optical character recognition system to extract target data from the digital data image and verify that the electronic data matches information that is based on the extracted target data;

extracting target data from each respective digital data image based on retrieved configuration information, wherein the extracting is based on the configuration information corresponding to each respective digital data image and the target data includes income information;

verifying the electronic data by comparing it with the target data extracted from each respective digital data image and determining whether the income information in the electronic data and target data match; and receiving and displaying the income verification results in a service administrator graphical user interface within a specified time period for further processing of the web-based electronic user filled form.

20. A system for validating electronic data, the system comprising:

a computer processor;

a memory that stores instructions, wherein the instructions when executed by the computer processor cause the computer processor to:

poll a queue by robotic process automation for received electronic data in a web-based electronic user filled form for a credit application, wherein the electronic data includes income information;

download concurrently a digital data image from an online optical storage when the electronic data is received, wherein the digital data image is based on documents provided by the user and corresponds to the received electronic data;

transmit the electronic data and the digital data image to a remote optical character recognition system to extract target data from the digital data image and verify that the electronic data matches information that is based on the extracted target data;

extract target data from each respective digital data image based on retrieved configuration information, wherein the extracting is based on the configuration information corresponding to each respective digital data image and the target data includes income information;

verify the electronic data by comparing it with the target data extracted from each respective digital data image and determining whether the income information in the electronic data and the target data match; and receive and display the income verification results in a service administrator graphical user interface within a specified time period for further processing of the web based electronic user filled form.

\* \* \* \* \*